(12) United States Patent
Fujikawa et al.

(10) Patent No.: US 6,424,292 B1
(45) Date of Patent: Jul. 23, 2002

(54) RADAR DEVICE AND THE LIKE

(75) Inventors: Takumi Fujikawa; Motoji Kondo, both of Nishinomiya (JP)

(73) Assignee: Furuno Electric Co., Ltd., Hyogo (JP)

( * ) Notice: Subject to any disclaimer, the term of this patent is extended or adjusted under 35 U.S.C. 154(b) by 0 days.

(21) Appl. No.: 09/763,237

(22) PCT Filed: Jul. 23, 1999

(86) PCT No.: PCT/JP99/03987

§ 371 (c)(1),
(2), (4) Date: Jun. 1, 2001

(87) PCT Pub. No.: WO00/11493

PCT Pub. Date: Mar. 2, 2000

(30) Foreign Application Priority Data

Aug. 21, 1998  (JP) ............................................. 10-235391

(51) Int. Cl.[7] .......................... G01S 7/298; G01S 7/531; G01S 7/06; G01S 7/51
(52) U.S. Cl. ........................ 342/185; 342/175; 342/176; 342/195
(58) Field of Search .............................. 342/27, 28, 41, 342/175–186, 195, 134–144; 315/367, 378

(56) References Cited

U.S. PATENT DOCUMENTS

| | | | | |
|---|---|---|---|---|
| 3,309,702 A | * | 3/1967 | Saxton | ........................ 342/144 |
| 3,792,304 A | * | 2/1974 | Dalena et al. | ............... 315/367 |
| 3,975,662 A | * | 8/1976 | Janosky | ....................... 315/378 |
| 4,069,481 A | * | 1/1978 | Easy et al. | ................... 342/185 |
| 6,211,814 B1 | * | 4/2001 | Benjamin et al. | ........... 342/185 |

* cited by examiner

Primary Examiner—Bernarr E. Gregory
(74) Attorney, Agent, or Firm—Pillsbury Winthrop LLP

(57) ABSTRACT

When the range scale has been changed, past target images which have been stored are converted to fit to a new range scale such that the past target images can be displayed in continuity on the new range scale without erasing the previously stored past target images. When the range scale is switched by operating a range selector 24, a controller 23 sets the amount of address shift K2 for a current-image video memory 20 and the amount of address shift K1 for a past-image video memory 21. Data in the past-image video memory 21 are successively read out according to K1 and transferred to the current-image video memory 20 in a first step. During this step, access address of the memory 20 is advanced according to K2. In a second step, the data stored in the current-image video memory 20 is re-transferred back to the past-image video memory 21 according to the re-set amounts of address shift K1 and K2. Upon completion of data transfer of the first step and data re-transfer of the second step, normal operation is resumed on the new range scale.

6 Claims, 15 Drawing Sheets

Fig. 3

|  | REDUCED TO 1/N | ENLARGED N TIMES |
|---|---|---|
| FIRST STEP (TRANSFER) | K1 = 1<br>K2 = 1/N | K1 = 1<br>K2 = 1 |
| SECOND STEP (RE-TRANSFER) | K1 = 1<br>K2 = 1 | K1 = 1<br>K2 = 1/N |

RADAR DEVICE AND THE LIKE

This application is the national phase of international application PCT/JP99/03987 filed Jul. 23, 1999 which designated the U.S., and that international application was not published under PCT Article 21 (2) in English.

TECHNICAL FIELD

The present invention relates to apparatus, such as radars and sonars, which store received echo signals defined in a polar coordinate system into a video memory having an array of memory elements arranged in the form of a Cartesian coordinate system to cover all directions in a horizontal plane, and then present the stored data on a raster-scan display screen. More particularly, the invention is concerned with radar and like apparatus which have two video memories, one for storing a current image and the other for storing a past image, and display the image data stored in the two video memories with the past and current images superimposed on each other.

BACKGROUND ART

FIG. 1 is a block diagram of a conventional radar apparatus.

While rotating at a specific speed in a horizontal plane, a radar antenna 1 transmits pulses of radio waves at a specific pulse repetition rate and receives echoes of radio waves reflected by targets. A receiver circuit 2 detects and amplifies signals received by the radar antenna 1. An analog-to-digital (A/D) converter 3 converts an analog signal obtained by the receiver circuit 2 into a digital signal. A primary memory 4 stores A/D-converted data for one sweep in real time, and is used as a buffer for writing the one-sweep data into a video memory in a succeeding stage until the stored data is overwritten by new one-sweep data resulting from a next transmission and obtained.

A selector 11 switches a clock input to the primary memory 4 between a write clock necessary when writing data into the primary memory 4 in real time and a read clock necessary when transferring the data to the video memory.

A coordinate converter 12 generates addresses representative of pixels of the video memory arranged in a Cartesian coordinate system successively from the center of the system outward, a start address corresponding to coordinates of the center, based on antenna direction θ referenced to the heading of a ship and a location in the primary memory 4 from which a signal is read out, for example. Specifically, the coordinate converter 12 is constructed of hardware which performs operations expressed by the following equations:

$$X = Xs + r \sin \theta$$

$$Y = Ys + r \cos \theta$$

where

X and Y are coordinates of an address representative of a pixel in the video memory;

Xs and Ys are coordinates of the center address;

r is the distance from the center to the pixel; and

θ is the direction of a pixel for coordinate conversion.

In the apparatus described above, received data are distributed densely around the sweep center and sparsely in peripheral areas from a geometrical point of view and, therefore, the nearer to the sweep center, the larger the number of data corresponding to the same addresses of the video memory. There can be a case where more than one successive data corresponds to the same address of the video memory while a row of received data is being written into the video memory. When a plurality of different data correspond to the same pixel as seen in the above example, a problem would arise if a simple overwriting method is used. This is because if data written in one pixel is simply overwritten by succeeding data assigned to the same pixel, only the last written data would be left, invalidating the previously written data. One conventional approach taken to overcome this problem is, for example, a maximum data sampling method, in which data having a maximum value among all received data assigned to the same address is written therein. In this maximum data sampling method, it is determined whether data is being written for the first time, or the second or more time, in each address of the video memory. If data is being written for the first time, most recently received data is written by a write data generator 5. If, however, data is being written for the second or more time, the write data generator 5 compares the most recently received data with the previously written data and writes the data having a larger value. Consequently, data having the maximum value among all received data assigned to the same pixel is obtained.

A current-image video memory 7 is a memory for storing the latest target image, wherein the most recently received data for one frame is stored via the write data generator 5. A past-image video memory 8 stores a series of target images by accumulatively storing the received data. This past-image video memory 8, when employed in a shipborne radar, for example, allows an operator to see the track of a target ship by superimposing the previously stored image on the latest image. Provision of this memory 8 helps to recognize surrounding situations and enhance navigational safety. Also, when the past-image video memory 8 is employed in a sonar, it becomes possible to recognize the movement of fish schools.

In the radar apparatus thus constructed, data to be written into the past-image video memory 8 is generated by a track data generator 6. When the received data is equal to or higher than a specific level, the track data generator 6 determines that there is track data and writes the track data in a corresponding address of the video memory 8. In this process, a logical sum of previously written track data and the new track data is taken as current write data, thus allowing past target images to be accumulated. In actual applications, however, simply accumulating the past target images would result in a cluttered picture because unwanted noise becomes accumulated with the lapse of time. To avoid this inconvenience, a practical processing technique is used, such as to automatically erase past target tracks which have been stored in the past-image video memory 8 for over a specific period of time.

Each of the video memories 7, 8 has a storage capacity sufficient to store the data received at least during one antenna rotation. An unillustrated display controller reads out data contents of the video memories 7, 8 at a high speed in synchronization with scanning of a cathode ray tube (CRT) 10. A mixer 9 mixes the latest target image and the past target images in a manner that the two kinds of the images can be discriminated therebetween by monochrome shading or color gradations and outputs the images to the CRT 10 for on-screen presentation.

When the above-described conventional apparatus is switched from one range (detection range) to another to change display range scale, the target images stored on the previously used range are unusable because they do not fit to the new range scale. It is therefore necessary to once erase all the previously stored target images and newly store target images on the new range scale. Thus, there has been a problem that the operator could not recognize movements of target ships for some time after switching the range scale. If the past target images is preserved even when the range scale has been switched, the preserved past target images might be reused when the apparatus is switched back to the original range. The preserved past target images would be unusable, however, if a newly selected range differs even slightly from the original range.

To solve these problems, it might be possible to prepare a plurality of past-image video memories and simultaneously store target tracks corresponding to a plurality of ranges. This, however, is economically difficult to put into practical use.

Accordingly, it is an object of the invention to provide radar and like apparatus, in which when the range scale has been switched, past target images which have been stored are converted to fit to a new range scale such that the past target images can be displayed in continuity on the new range scale without erasing the previously stored past target images.

DISCLOSURE OF THE INVENTION

Radar and like apparatus of the present invention comprise a current-image video memory for storing most recently received data, a past-image video memory for accumulatively storing previously received data, an indicator for superimposing and displaying the data stored in both the current-image video memory and the past-image video memory, and a controller for transferring the data stored in the past-image video memory to a buffer in a first step and re-transferring the data stored in the buffer back to the past-image video memory in a second step when display range scale has been changed, wherein address shift data K specifying the amount of address shift per transfer cycle in the buffer and the past-image video memory for said data transfer and re-transfer processes is changed in accordance with the range scale.

The current-image video memory may be used also as the buffer.

The controller may perform such a control operation that clears data content of the past-image video memory, which is a transfer source, at the same time when the data is transferred in the first step.

In the event of range switching, that is, when the range scale has been changed, the controller transfers the data stored in the past-image video memory to the buffer in the first step and re-transfers the data stored in the buffer back to the past-image video memory in the second step. In such data transfer and re-transfer processes, the controller changes the address shift data K specifying the amount of address shift per transfer cycle in the buffer and the past-image video memory in accordance with the range scale. With this arrangement, the data stored in the past-image video memory is scaled down or up in the data transfer and re-transfer processes performed when the range scale has been changed, so that an image conforming to a newly selected range scale is stored in the past-image video memory. As a consequence, the indicator continues to display a past target image even after the range scale has been changed. Although it is possible to provide the buffer as an independent element, the current-image video memory whose data content is entirely rewritten after the range scale has been changed may be used as the buffer. Furthermore, if the data content of the past-image video memory, which is the transfer source, is cleared at the same time when the data is transferred in the first step, a process for clearing the past-image video memory at a later time becomes unnecessary, and this make it possible to reduce the time required for data transfer.

Also, the controller may set the address shift data K (1) to satisfy K=1 for a transfer source and K=1/N for a transfer destination when scaling an on-screen image by a factor of 1/N, and (2) to satisfy K=1/N for the transfer source and K=1 for the transfer destination when scaling the on-screen image by a factor of N.

Since 0<K<=1 when K is set as described above, this approach facilitates the setting of K.

Furthermore, when executing a scale-down operation in which multiple memory pixels of a transfer source correspond to one memory pixel of a transfer destination, the controller may cause data having a maximum value among data in the multiple memory pixels of the transfer source to be stored in the one memory pixel of the transfer destination.

While the aforementioned maximum data sampling operation is an operation to be performed in coordinate conversion, it becomes possible to prevent important data from being erased by executing the maximum data sampling operation in the data transfer process performed in the event of range switching.

BRIEF DESCRIPTION OF THE DRAWINGS

FIG. 3 is a chart showing set values of shift data K for first and the second steps;

BEST MODES FOR CARRYING OUT THE INVENTION

Figure 2:
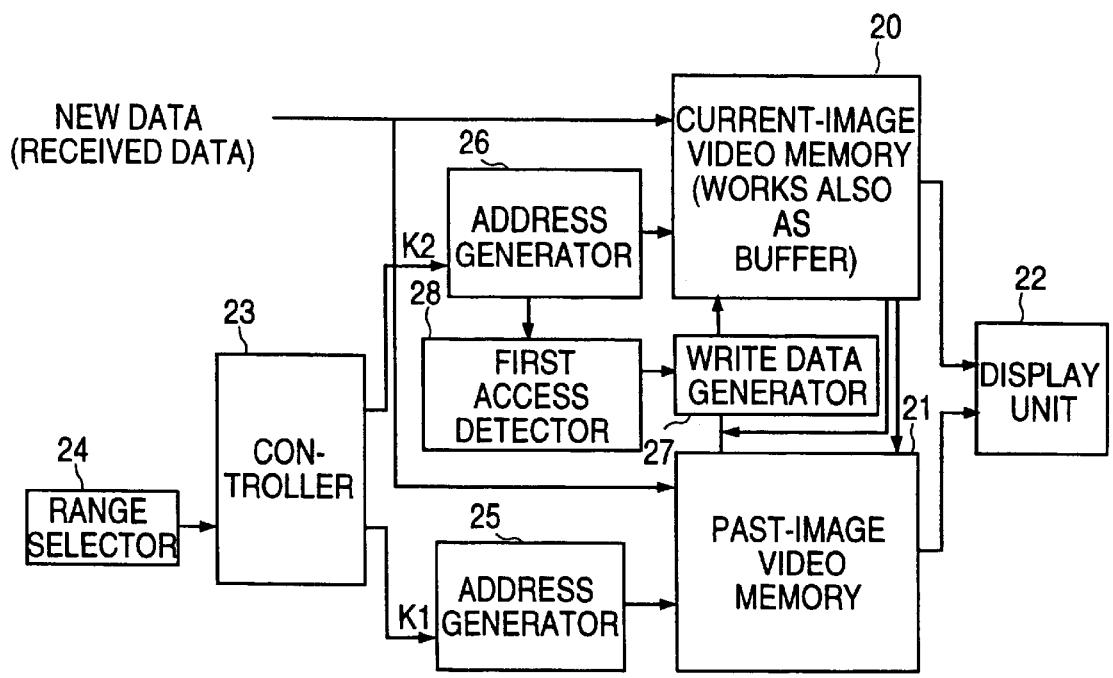
FIG. 2 is a schematic block diagram of principal part of a radar apparatus according to an embodiment of the invention.

FIG. 2 is a schematic block diagram of principal part of a radar apparatus according to an embodiment of the present invention. Elements, such as a radar antenna, an A/D converter and a primary memory, are configured in the same fashion as described with reference to the prior art.

New data (received data) output from the primary memory is stored in a current-image video memory 20 as well as a past-image video memory 21. As is the case with the apparatus shown in FIG. 1, the past-image video memory 21 produces a logical sum of the new data and previously written data by an unillustrated circuit (which corresponds to the track data generator 6 in FIG. 1). A display unit 22 displays data stored in these two memories 20, 21 in superimposition on each other.

A range (detection range) selected by a range selector 24 is entered to a controller 23. Then, according to the magnitude of the selected range, the controller 23 outputs memory address shift data K (K1, K2) to an address generator 25 for the past-image video memory 21 and to an address generator 26 for the current-image video memory 20, respectively. The address generators 25, 26 advance the addresses of the memories 20, 21 according to the respective address shift data K entered.

When the range scale is switched (or the scale is changed), data stored in the past-image video memory 21 is transferred to the current-image video memory 20 by way of a write data generator 27 as a first step, and data stored in the current-image video memory 20 is re-transferred back to the past-image video memory 21 as a second step. This transfer and re-transfer operation is performed in a short time in the event of range switching. Thereafter, new data is successively stored in the current-image video memory 20, and the data read out from the memories 21, 20 are superimposed on each other and displayed on the display unit 22. The aforementioned operation is executed each time the range scale is switched by operating the range selector 24. As a result, past target images continue to be displayed on the display unit 22 even after the range scale has been switched.

A first access detector 28 judges whether an address is first accessed by the address generator 26 after range switching and outputs the judgment result to the write data generator 27. If the access by the address generator 26 is judged to be a first access in the first step, the write data generator 27 transfers data stored in the memory 21 as it is to the memory 20. If, however, the access by the address generator 26 is not the first access to the address, the write data generator 27 selects data having a larger value from the data transferred from the memory 21 and the data in the memory 20, and writes the selected data into the memory 20. When the data is scaled down in the first step in which the data is transferred from the memory 21 to the memory 20, a plurality of pixels of the memory 21 correspond to one pixel of the memory 20. Thus, a first access judgment output occurs in certain cases and does not occur in the other cases. Since the write data generator 27 writes the data of the memory 21 as it is when the first access is detected, and writes the data read from the memory 21 or the data stored in the memory 20 whichever having a larger value when the first access is not detected, data having a maximum value among the data for a plurality of pixels of the memory 21 corresponding to one pixel of the memory 20 is written therein in the first step.

Next, the address shift data K for scaling an image by a factor of 1/N and those for scaling the image by a factor of N as a result of range switching are explained with reference to FIG. 3.

Figure 4:
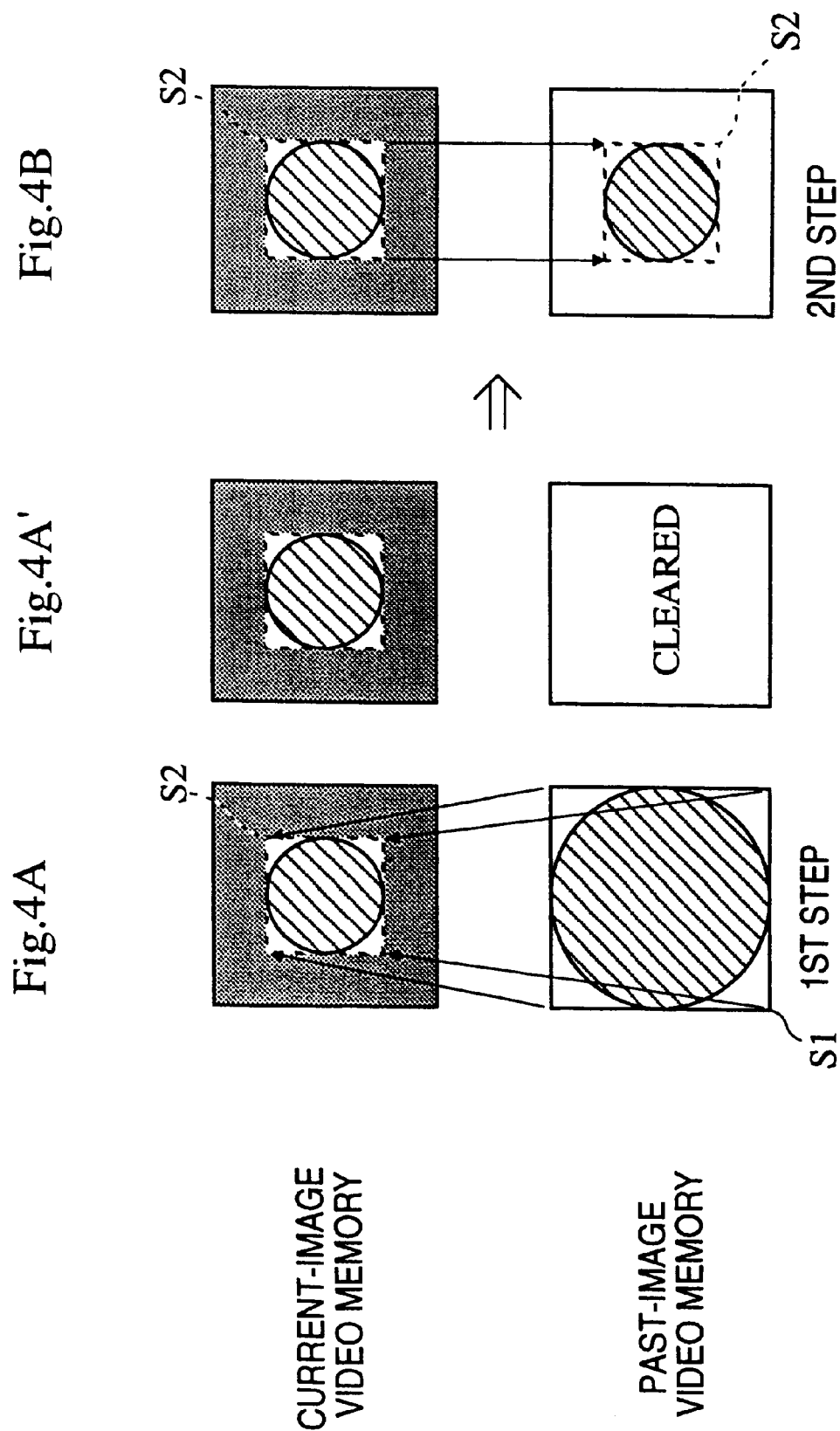
FIGS. 4A, 4A', and 4B are diagrams illustrating a scale-down operation.

When executing a 1/N-times scale-down operation, the address shift data K are set to satisfy K1=1 and K2=1/N in the first step. As a result, data stored in the memory 21 is scaled down to 1/N and stored in the memory 20 as shown in FIG. 4A. Here, an image corresponding to the transferred data within the memory 21 is cleared every data transfer cycle in the first step as described above. This causes the memory 21 to be entirely cleared as shown in FIG. 4A' at the end of the first step. It is to be noted here that in FIG. 4, S1 denotes the size of the image stored in the past-image video memory 21 and S2 denotes the size of the image after execution of the above-described scale-down operation. Each circled area represents a region in which image data is actually available. Own ship is always located at the central position of the image.

Subsequently, the address shift data K are set to satisfy K1=K2=1 in the second step. As a result, the data stored in the memory 20 is transferred back to the memory 21 at a scale factor of 1 as shown in FIG. 4B. It is to be noted that the aforementioned processes of the first and second steps are performed using the own ship position (central position of the areas S1 and S2) as a reference point.

Since a reduced past image is stored in the memory 21 by executing the first and second steps at the time of range switching as described above, the past image to be shown on the display unit 22 is displayed on a reduced range scale.

When executing an N-times scale-up operation, the address shift data K are set to satisfy K1=K2=1 in the first step. As a result, data stored in the memory 21 is transferred to the memory 20 at a scale factor of 1 as shown in FIG. 5A. Although the entire data stored in the memory 21 is scaled down and transferred to the memory 20 in the aforementioned scale-down operation, only that part of image data which is contained in an area S3 corresponding to the scale factor N is transferred to the memory 20 in the scale-up operation. Here, S4 denotes a transfer-destination image area in the memory 20. The areas S3 and S4 are small when the scale factor is large, and the areas S3 and S4 are large when the scale factor is small. The sizes of the areas S3 and S4 are so set that their scaled-up area matches the size of the memory 21. A portion of the memory 21 corresponding to its area S3 is cleared as shown in FIG. 5A', as in the case of the scale-down operation depicted in FIG. 4.

Subsequently, the address shift data K are set to satisfy K1=1 and K2=1/N in the second step. In the scale-up operation, the image data is scaled up in the second step. Here, S5 denotes a transfer-destination region which is equal to the area of the memory 21 in this case.

Figure 5:
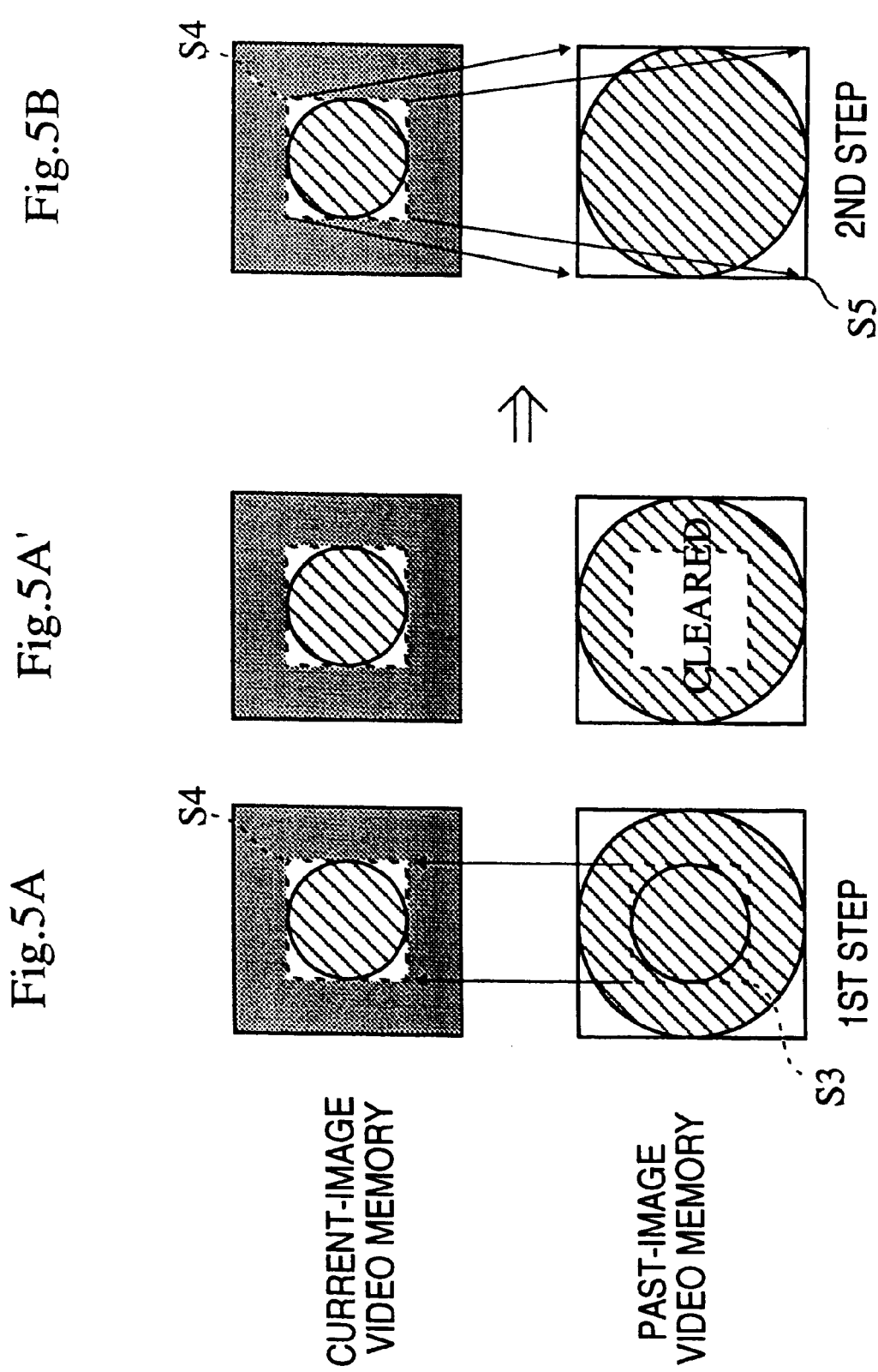
FIGS. 5A, 5A', and 5B are diagrams illustrating a scale-up operation.

The image data is scaled down in the first step of the scale-down operation and the image data is scaled up in the second step of the scale-up operation as described above. Contrary to this, it is also possible to scale down the image data in the second step of the scale-down operation and to scale up the image data in the first step of the scale-up operation. When taking this alternative approach, the address shift data K should be set to satisfy K1=1 and K2=1 in the first step and to satisfy K1=1/N and K2 =1 in the second step to perform the scale-down operation. Also, the address shift data K should be set to satisfy K1=1/N and K2=1 in the first step and to satisfy K1=K2=1 in the second step to perform the scale-up operation. The storage capacity of the past-image video memory 21 is usually made larger than that of the current-image video memory 20. Therefore, if the image data is transferred at a scale factor of 1 in the first step when executing the scale-down operation, or if the image data is scaled up in the first step when executing the scale-up operation, there can arise a case where the entire image data in the memory 21 can not be transferred to the memory 20. This problem can be solved by making the area containing data to be transferred to the memory 20 in the first step smaller than the transfer-destination image area as shown in FIGS. 4 and 5.

Figure 6:
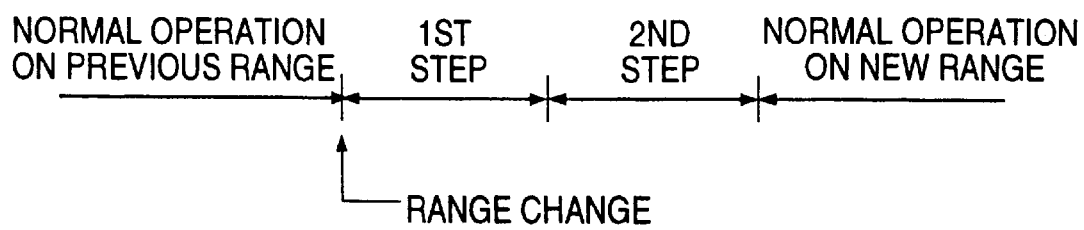
FIG. 6 is a diagram illustrating an operation performed in the event of range switching.

FIG. 6 shows an operating procedure used when switching the range scale. When the range scale is switched during normal operation of the radar apparatus on a previously selected range, the operation of the first step is executed, followed by execution of the operation of the second step. The apparatus operates normally on the newly selected range thereafter.

More detailed construction of the radar apparatus is now described below.

Figure 1:
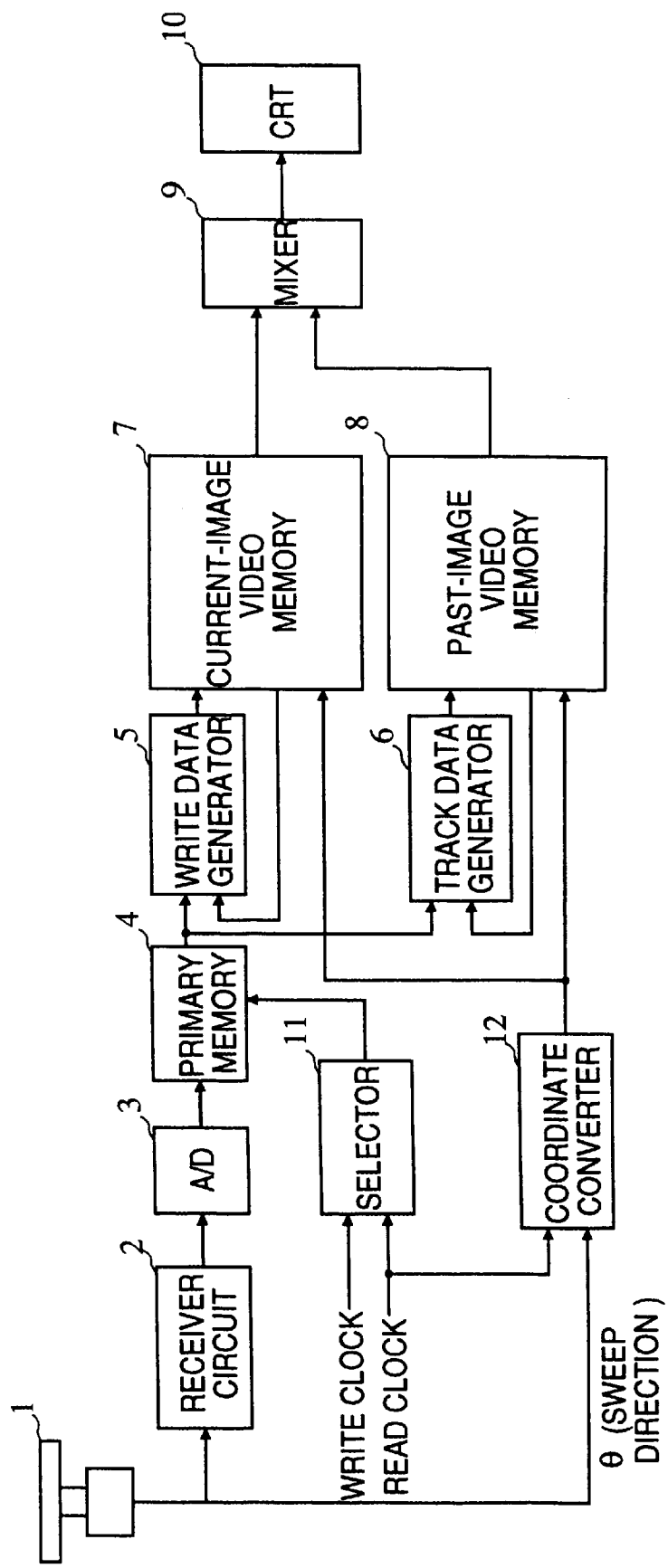
FIG. 1 is a block diagram of a conventional radar apparatus.
Figure 7:
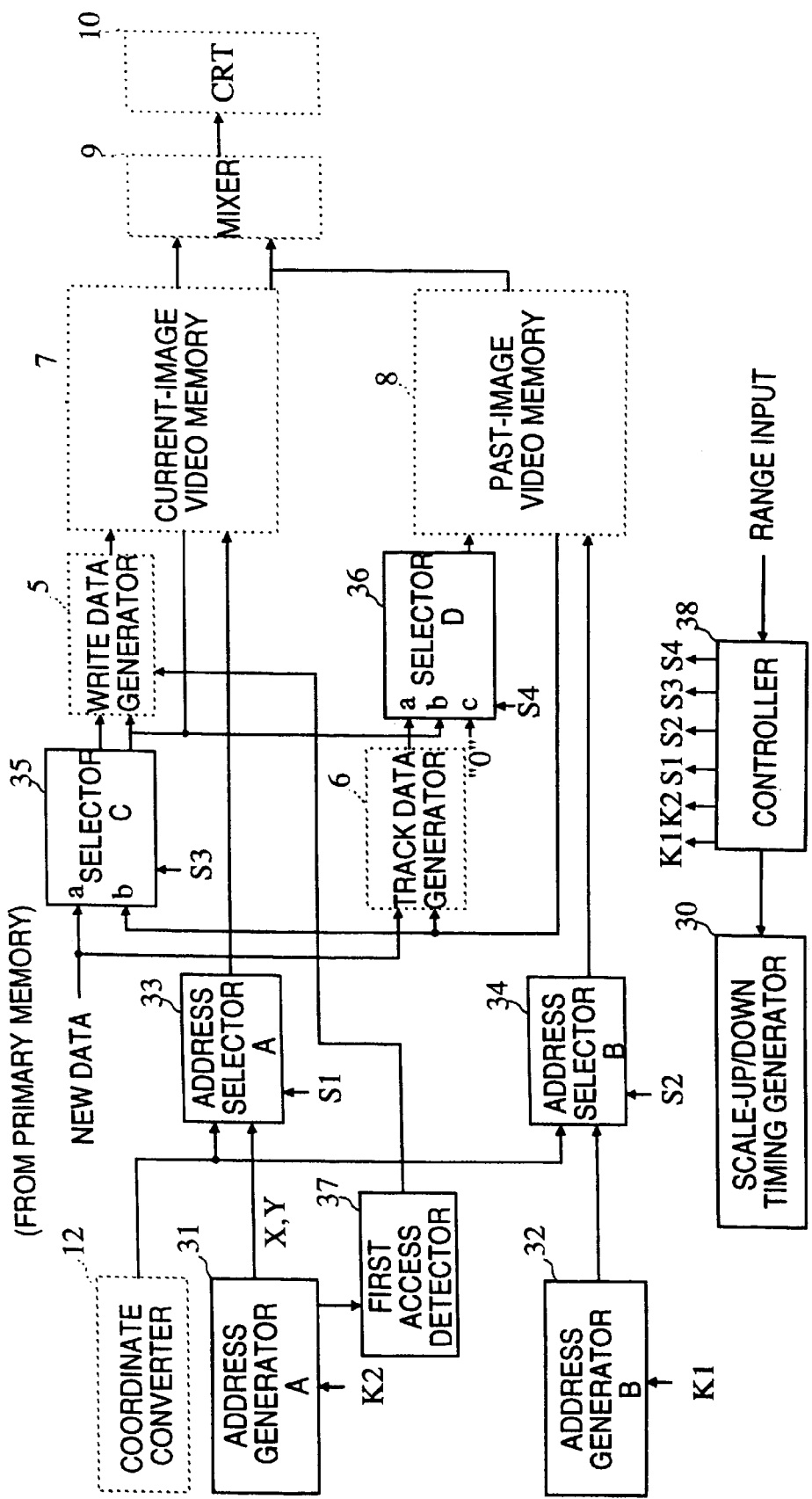
FIG. 7 is a detailed block diagram of principal part of the radar apparatus according to the embodiment of the invention.

FIG. 7 provides a more detailed representation of the construction shown in FIG. 2. In FIG. 7, elements identical to those of the earlier-described conventional apparatus depicted in FIG. 1 are shown by dotted lines and denoted by the same reference numerals.

Figure 8:
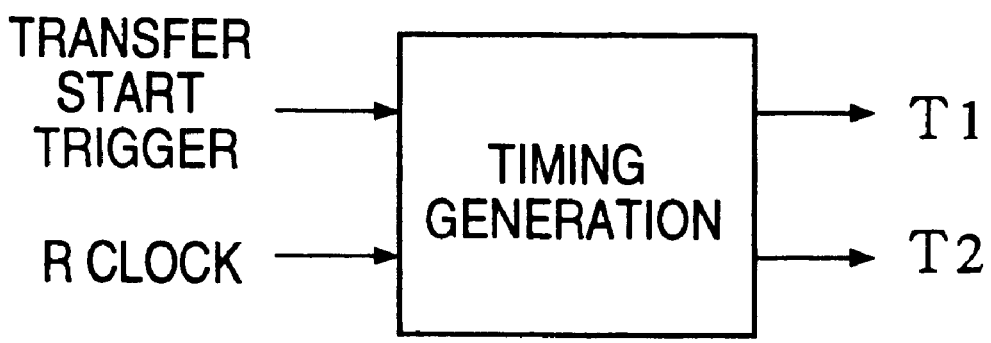
FIG. 8 is a block diagram of a scale-up/down timing generator.
Figure 9:
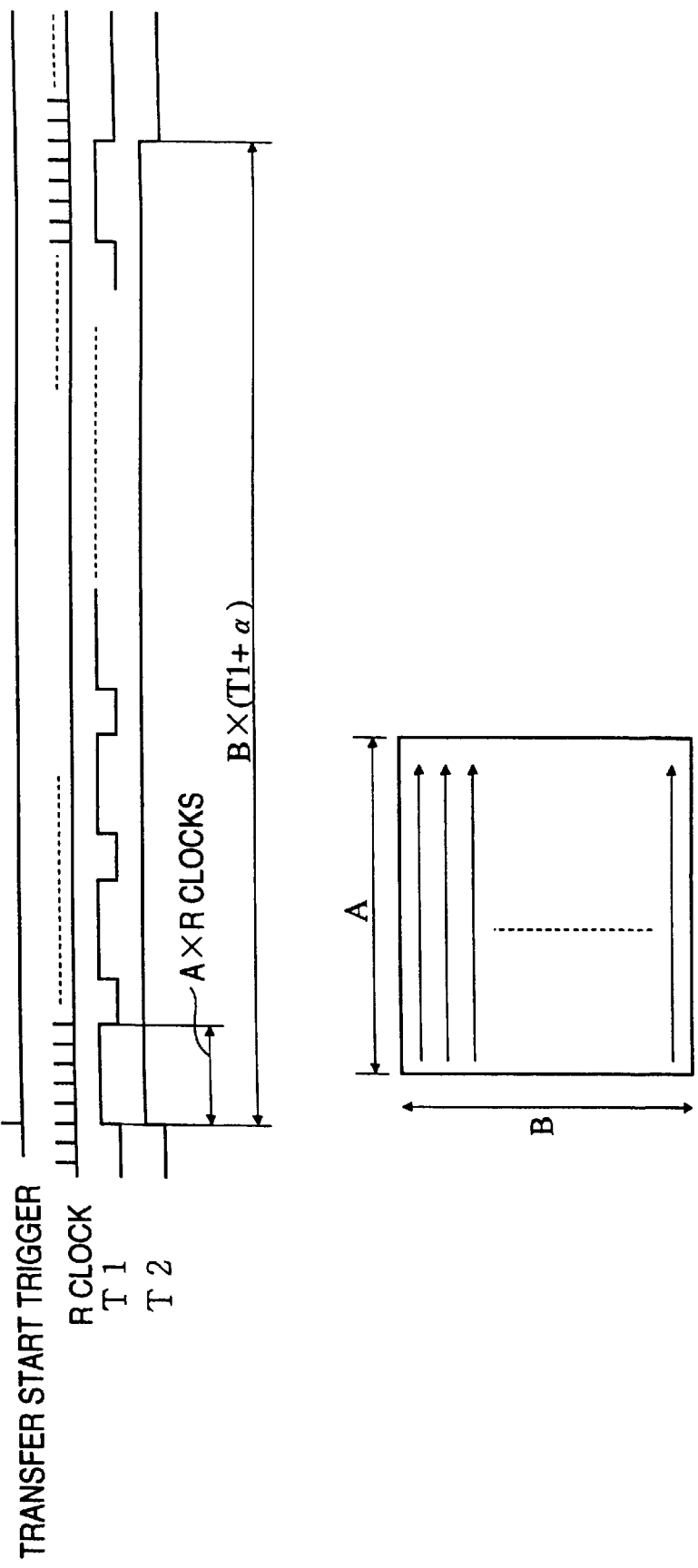
FIG. 9 is a timing chart.

A scale-up/down timing generator 30 is formed of a timing generator circuit as shown in FIG. 8. When a transfer start trigger is fed from a controller 38, the scale-up/down timing generator 30 counts an R clock, which is a read clock for a primary memory 4, and generates a T1 signal (representative of the time required for "A" number of R clocks to occur), which corresponds to a transfer period required for data transfer in the X-direction, and a T2 signal (representative of the time required for "B" number of the transfer periods T1 to elapse), which corresponds to a total transfer period. FIG. 9 shows the relationship among the transfer start trigger, R clock, T1 and T2. The numbers "A" and "B" are determined by the size of an image transfer region, in which "A" represents transfer cycle length in the X-direction and "B" represents transfer cycle length in the Y-direction. In the scale-down operation depicted in FIG. 4, for example, the image transfer region has the area S1 in the memory 21 and the area S2 in the memory 20 in the first step while the image transfer region has the area S2 in both of the memories 20, 21 in the second step.

An address generator 31 (address generator A) generates data transfer addresses of a current-image video memory 7, and an address generator 32 (address generator B) generates data transfer addresses of a past-image video memory 8. Expressing the coordinates of a transfer cycle point encountered at the nth transfer cycle in the X-direction and the mth transfer cycle in the Y-direction from a transfer start address as (Xn, Ym), $$Xn = Xs + K \cdot n$$

$$Ym = Ys + K \cdot m$$

where (Xs, Ys) is the transfer start address and K is the amount of address shift per transfer cycle (0<K<=1).

The transfer start address (Xs, Ys) is the extreme upper-left address within the past-image video memory 8, which is a transfer source, and is the extreme upper-left address in the area S2 within the current-image video memory 7, which is a transfer destination, in the first step of the scale-down operation shown in FIG. 4, for example.

Figure 10:
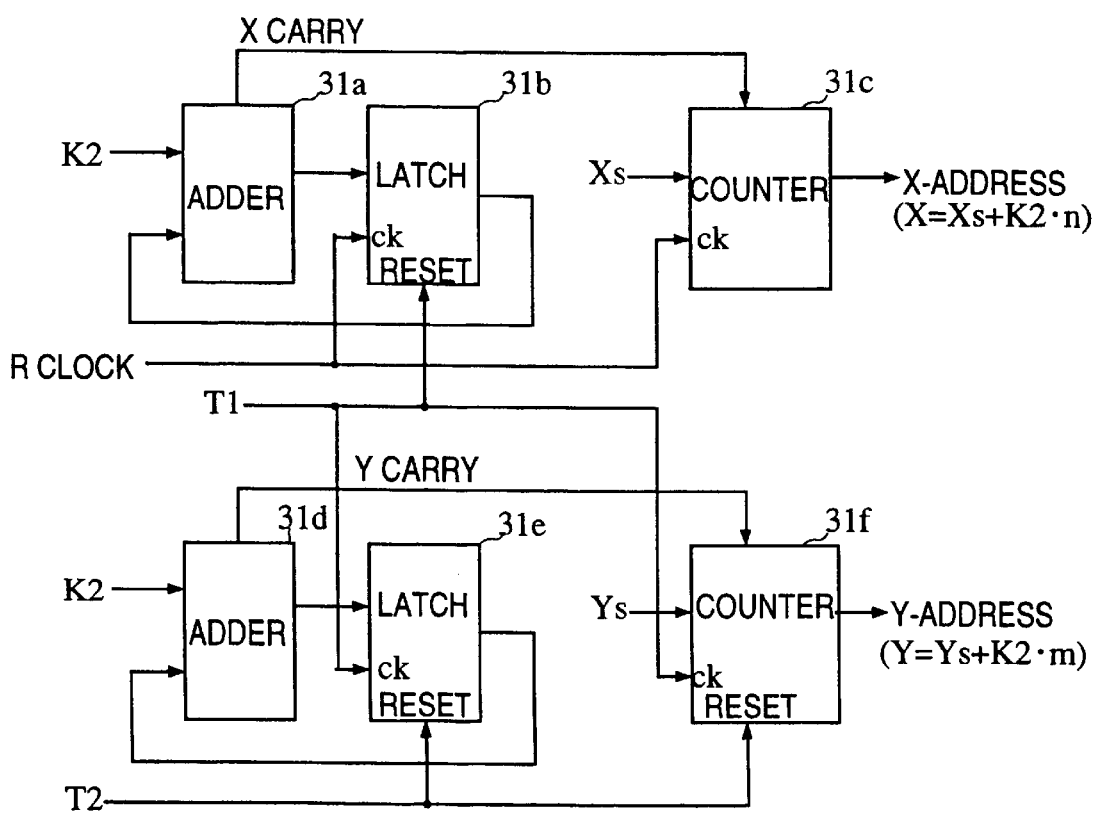
FIG. 10 is a block diagram of an address generator A.

FIG. 10 is a block diagram of the address generator 31. An X-address generating section is constructed of an accumulator circuit formed of an adder 31a and a latch 31b, and a counter 31c. The accumulator circuit adds up the address shift K2 each time the R clock is input, and the counter 31c counts X carries resulting from this adding operation. The accumulator circuit and the counter 31c are reset at T1. Also, the transfer start address Xs is fed into the counter 31c as an initial value.

A Y-address generator section is constructed of an accumulator circuit formed of an adder 31d and a latch 31e, and a counter 31f which counts Y carries resulting from the adding operation. The accumulator circuit and the counter 31f are reset at T2. The transfer start address Ys is fed into the counter 31f as an initial value.

Figure 11:
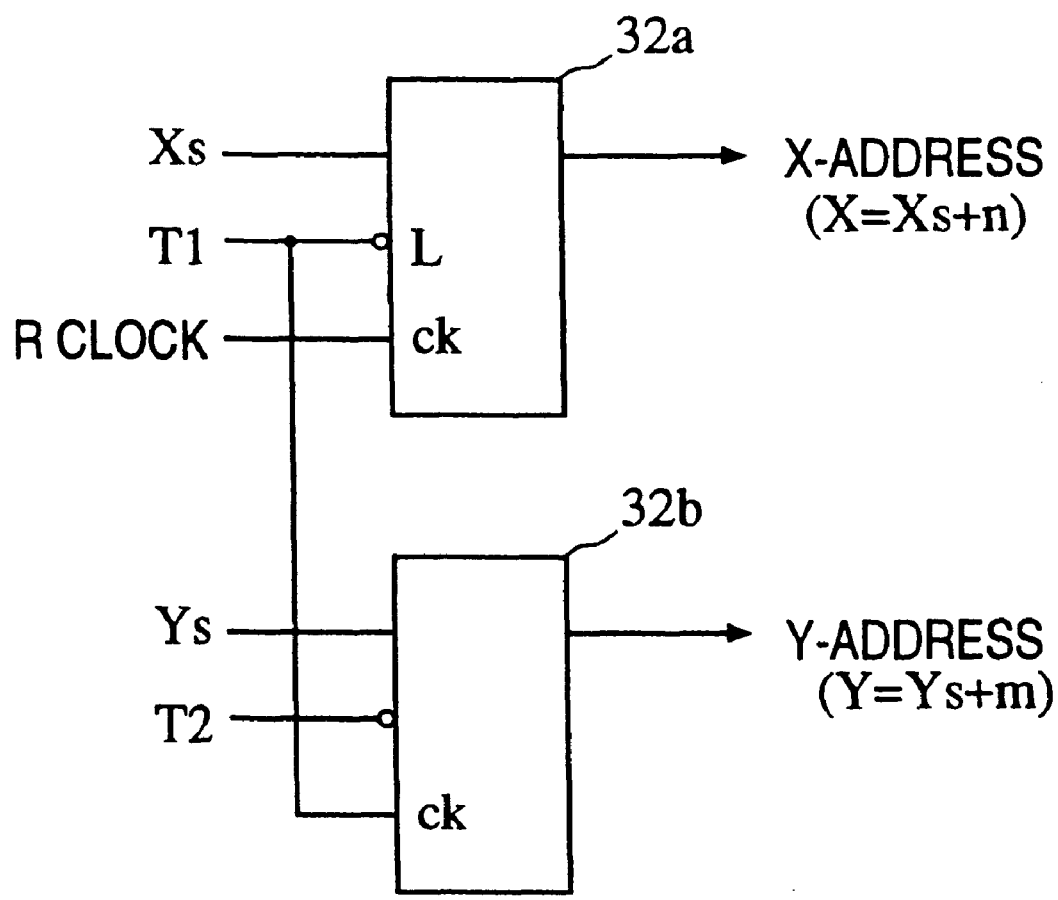
FIG. 11 is a block diagram of an address generator B.
Figure 12:
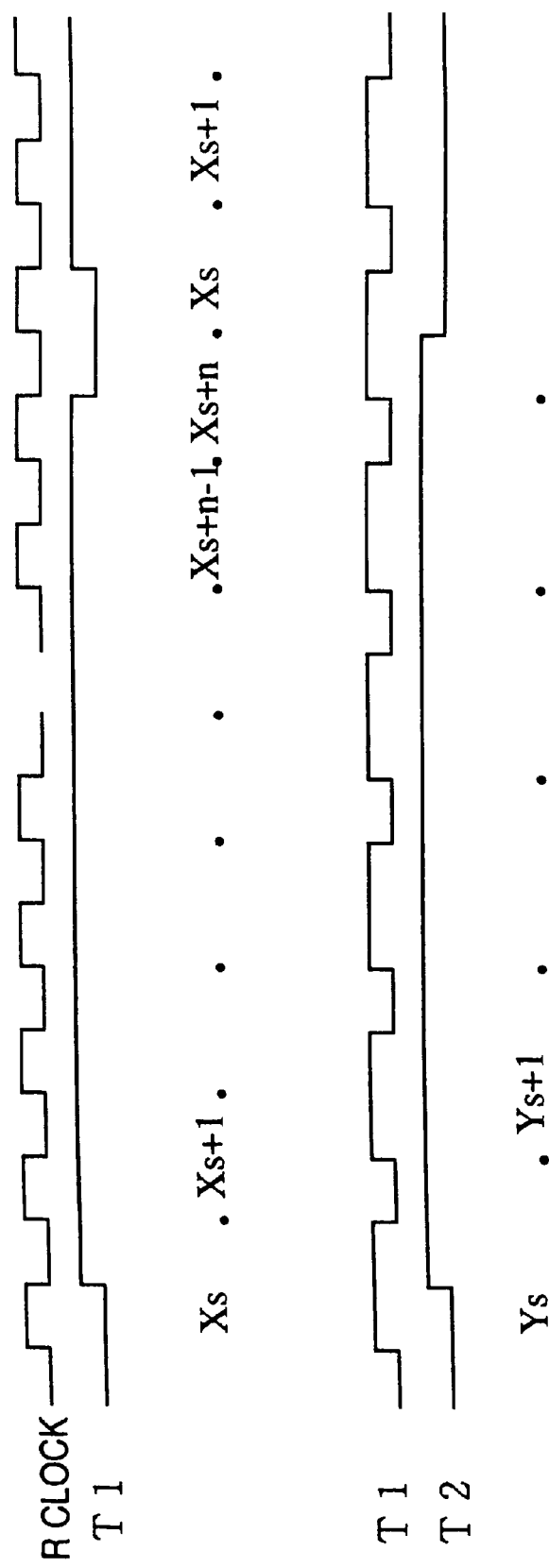
FIG. 12 is a timing chart showing the operation of the address generator B.

FIG. 11 is a block diagram of the address generator 32. In this embodiment, K1 is set to 1 in all cases regardless of whether the scale-down or scale-up operation is being executed as shown in FIG. 3. More specifically, the address shift K1 for the past-image video memory 8 is always set to 1 per transfer cycle. Therefore, the address generator 32 is constructed of counters 32a and 32b alone with no accumulators, as shown in FIG. 11. FIG. 12 is a chart showing how the address is incremented in the address generator 32. Specifically, the X-address and the Y-address are incremented one by one, such as Xs, Xs+1, ..., and Ys, Ys+1, ..., respectively.

An address selector 33 (address selector A) is a selector which selects an address to be delivered to the current-image video memory 7. The address selector 33 outputs an address generated by a coordinate converter 12 during normal operation, while it outputs an address generated by the address generator 31 (address generator A) when the range scale has been switched.

An address selector 34 (address selector B) is a selector which selects an address to be delivered to the past-image video memory 8. The address selector 34 outputs an address generated by the coordinate converter 12 during normal operation, while it outputs an address generated by the address generator 32 (address generator B) when the range scale has been switched.

A selector 35 (selector C) is a selector which selects data to be delivered to the current-image video memory 7. The selector 35 outputs data read from the primary memory 4 during normal operation, while it outputs data read from the past-image video memory 8 when the range scale has been switched.

A selector 36 (selector D) is a selector which selects data to be delivered to the past-image video memory 8. The selector 36 outputs data of the track data generator 6 during normal operation. When the range scale has been switched, the selector 36 outputs 0 to read the data content of one address of the memory 8 and immediately clear the data content of that address in the first step, and outputs data read from the current-image video memory 7 at a range change to transfer the data content of the current-image video memory 7 to the past-image video memory 8 in the second step.

A write data generator 5, provided also in the conventional radar apparatus for executing maximum data sampling operation as shown in FIG. 1, works as follows when the range scale has been switched. In the first step of the scale-down operation, data of multiple pixels of the transfer-source memory 8 usually correspond to one pixel of the transfer-destination memory 7. In this case, if data written in one pixel is simply overwritten by succeeding data assigned to the same pixel, only the last written data would be left, invalidating the previously written data. Under this circumstance, the write data generator 5 performs the maximum data sampling operation in order that data having a maximum value among the multiple pixel data is transferred as pixel data of the transfer-destination memory 7. Accordingly, the write data generator 5 performs the same maximum data sampling operation regardless of whether the radar apparatus is under normal operation or the range scale has been switched. As it is necessary to make a first access judgment to determine whether an address of the memory 7 is accessed for the first time for executing the maximum data sampling operation, there is provided a first access detector 37.

When executing the scale-up operation, the write data generator 5 outputs data read out from the current-image video memory 7 in the second step. While the same data is read out from the same address more than once in the scale-up operation, the data read from the current-image video memory 7 is used as write data to be written in the current-image video memory 7 again, thus preventing the content of the current-image video memory 7 from changing.

Figure 13:
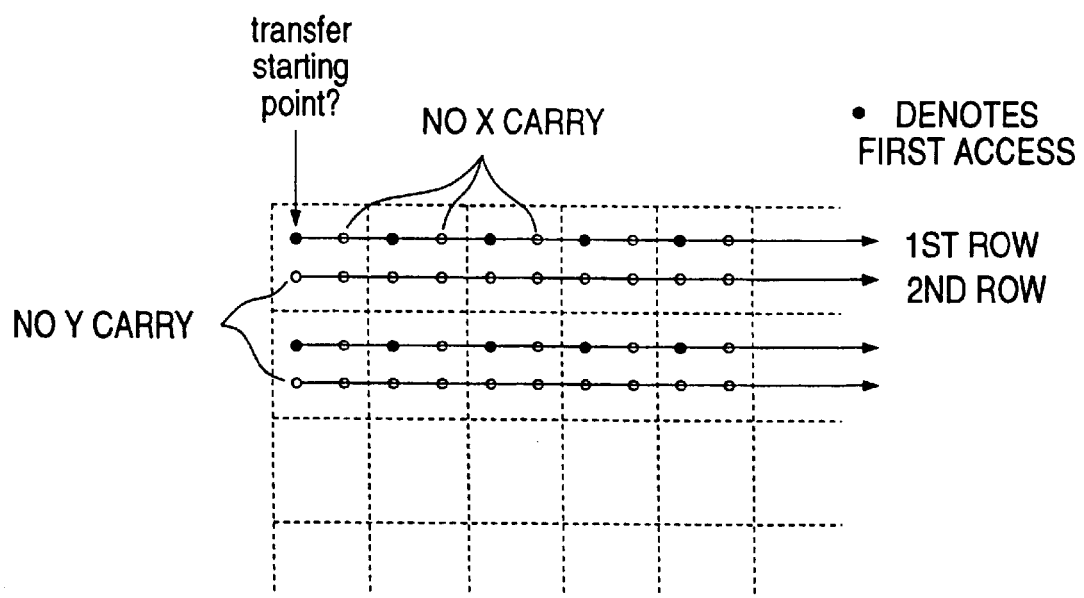
FIG. 13 is a diagram illustrating an operation performed by a first access detector.
Figure 14:
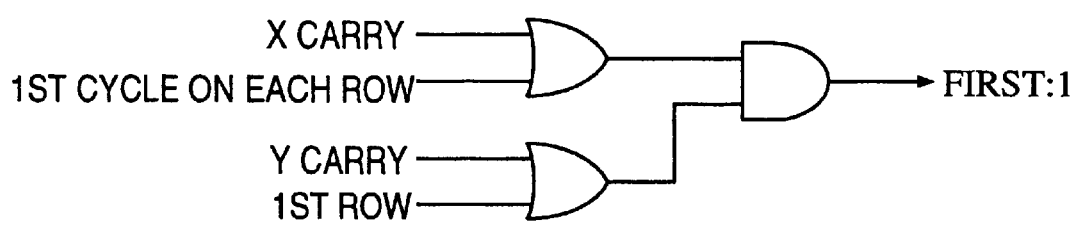
FIG. 14 is a block diagram of the first access detector.

The aforementioned first access detector 37 judges whether a pixel of the current-image video memory 7 is first accessed in the first step of the scale-down operation. This first access judgment is made based on X and Y carries output from the address generator 31. Specifically, it is forcibly assumed that there is an X carry at the first transfer cycle in each row and there is a Y carry in the first row, as shown in FIG. 13. When an X carry occurs in a row in which a Y carry has occurred, that is, when the X-address changes in a row in which the Y-address has changed from the preceding row, a first access is detected based on the judgment that the relevant address has been accessed for the first time. Here, the expression "row" refers to each line of memory elements arranged in the current-image video memory 7, and small regions divided by dotted lines in FIG. 13 represent the individual memory elements (pixels) of the current-image video memory 7. FIG. 14 is an exemplary circuit diagram of the first access detector 37.

When a range switching signal is entered to the scale-up/down timing generator 30, the controller 38 outputs a transfer start trigger, address shift data K1, K2 and selector switching signals S1–S4.

Next, operation of the radar apparatus is described.

When the range scale is switched, the controller 38 outputs a transfer start trigger to the scale-up/down timing generator 30 and address shift data K1 and K2 to the address generators 32 and 31, respectively. The controller 38 also outputs the switching signals S1–S4 to the respective selectors A–D at the same time. After this point in time, the apparatus halts the data sampling operation on the previously selected range and, in a short time until the data sampling operation is resumed on a newly selected range, reorganizes the data stored in the past-image video memory 8 to fit the new range scale by executing the aforementioned first and second steps.

First, when executing a 1/N-times scale-down operation, the address shift K2 for the current-image video memory 7, which is a transfer destination in the first step, is set to K2=1/N. The address shift K1 for the past-image video memory 8 is fixed to K1=1. When executing an N-times scale-up operation, on the other hand, the address shift data K are set to satisfy K1=K2=1 in the first step and to satisfy K2=1/N in the second step Operation performed in the first step is now described.

When the first step is initiated following the occurrence of the transfer start trigger, data in the image transfer region of the past-image video memory 8 are successively transferred to the current-image video memory 7 in accordance with incremental changes of address signals fed from the address generators 31 and 32. The image transfer region of the past-image video memory 8, which is now a transfer source, is the entirety of the memory 8 (area S1) in the scale-down operation (see FIG. 4), and is as large as the area S3 whose size depends on the scale factor in the scale-up operation (see FIG. 5). Address shifting is made in a linear fashion. Provided that the image transfer region is as large as "A" number of pixels in the X-direction and "B" number of pixels in the Y-direction, the address is shifted one by one in the X-direction from the transfer start address to an opposite end of the image transfer region by executing data transfer actions "A" times and, then, the address is incremented by one in the Y-direction and shifted again therefrom in the X-direction toward the opposite end of the image transfer region. The data transfer actions are executed "A" times in the X-direction and "B" times in the Y-direction in the above-described manner, whereby the data in the image transfer region of the past-image video memory 8 are entirely transferred.

When the scale-down operation is performed with the range scale switched from R0 to R1 (where R0<R1), data transferred from the past-image video memory 8 are scaled down centering the own ship position and written into the current-image video memory 7 in the first step. Since the address shift K1 for the past-image video memory 8 is K1=1 in this case, the address shift K2 for the current-image video memory 7, which is the transfer destination, is set to satisfy K2=R0/R1. Also, when transferring data of one pixel from the past-image video memory 8 through the selector 36 in the first step, 0 is written into the pixel of the past-image video memory 8 to clear the data at the same time. This makes it possible to omit an additional process which should otherwise be performed to clear the entire past-image video memory 8 before executing the second step, and thereby reduce processing time as a whole.

Furthermore, since a plurality of pixels of the past-image video memory 8 correspond to one pixel of the current-image video memory 7 in the first step for the scale-down operation, the first access detector 37 and the write data generator 5 perform the maximum data sampling operation, in which data having a maximum value among the multiple pixel data is written in the corresponding pixel of the current-image video memory 7.

On the other hand, when the range scale is switched from R0 to R1 (where R0>R1), the scale-up operation is performed. In this case, data in the image transfer region (area S3) of the past-image video memory 8 defined in accordance with the scale factor are successively read out and written into the current-image video memory 7 with incremental address shifts given by K2=1. The image transfer region is centered on the own ship position, which is the central position of the memory 8, in this case as well. Since K1=1 and K2=1, the pixels of the past-image video memory 8, which is the transfer source, and the pixels of the current-image video memory 7, which is the transfer destination, are in a one-to-one correspondence. Therefore, the address is shifted one by one in each successive transfer cycle, and the write data generator 5 outputs data read from the past-image video memory 8 at all times. As is the case with the scale-down operation, the data in the image transfer region of the past-image video memory 8 is cleared by writing 0 therein.

Next, operation performed in the second step is described.

In the second step of the scale-down operation, the address shift K2 is set to K2=1 and, therefore, data in the image transfer region (area S2) of the current-image video memory 7 are transferred, as they are, while maintaining a one-to-one correspondence to the past-image video memory 8. Since the past-image video memory 8 has been cleared in the first step, only those data which have already been scaled down are stored into the past-image video memory 8 at the end of the second step. When the second step is finished, the controller 38 changes the selector switching signals S1–S4 to resume normal operation on the new range scale.

In the second step of the scale-up operation, the address shift K2 is set to satisfy K2=R1/R0. Thus, the data read from the image transfer region (area S3) of the current-image video memory 7 centering the own ship position are scaled up and written into the past-image video memory 8 using the own ship position as a reference point. Subsequently, the controller 38 changes the selector switching signals S1–S4 to resume normal operation on the new range scale.

Although the data transferred from the past-image video memory 8 in the first step remain in the current-image video memory 7 at the beginning of normal operation on the new range scale, the data is updated to the latest image by executing an overwrite operation during one rotation of a sweep line under normal operation after the range switching.

Figure 15:
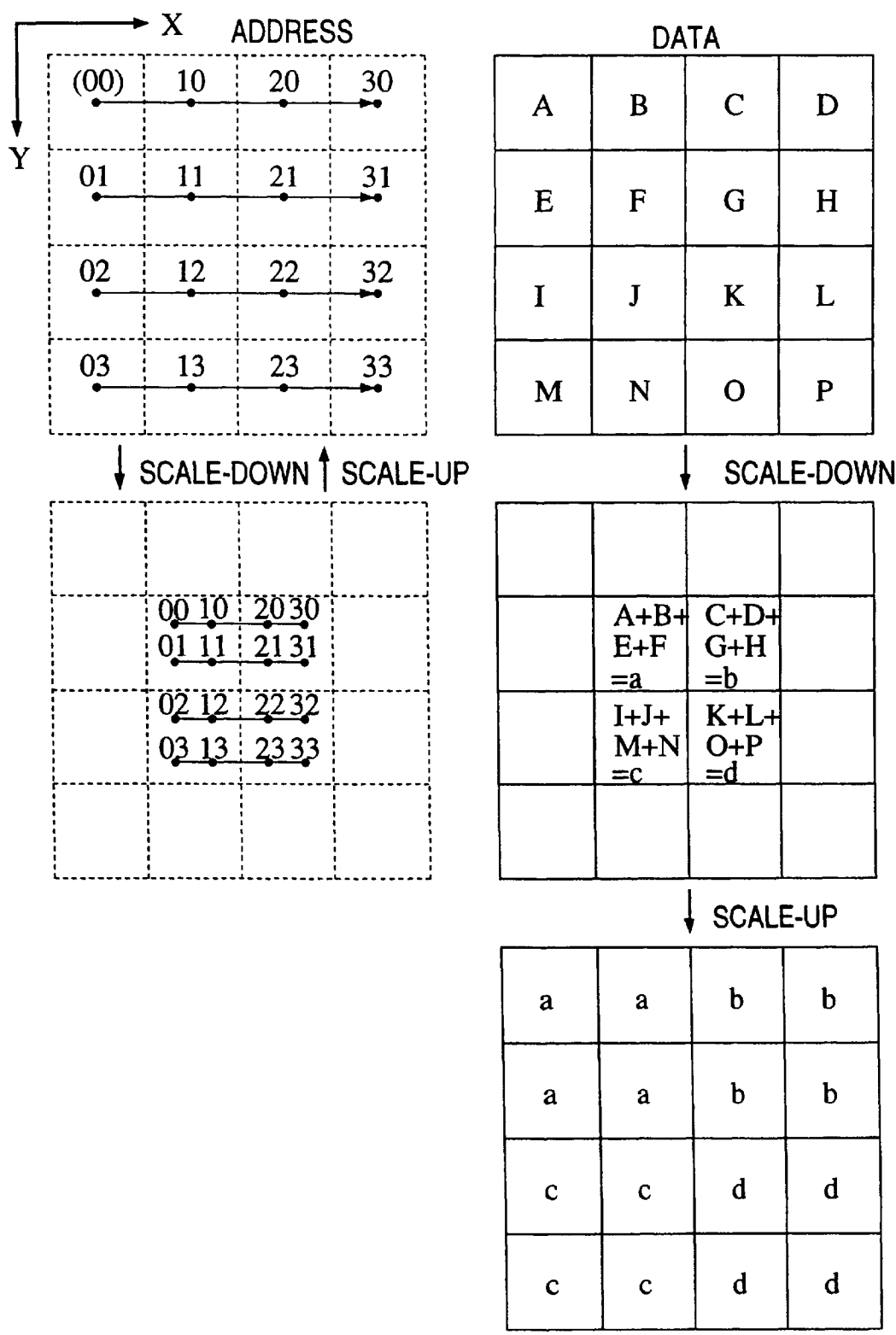
FIG. 15 is a diagram showing the relationship among transfer cycles, addresses and data in the scale-up and-down operations.

FIG. 15 is a diagram showing the relationship among transfer cycles, addresses and data in the scale-up and -down operations.

This Figure shows cases where source data are scaled by a factor of 1/2 and source data are scaled by a factor of 2. Given an address (n, m), n denotes the number of transfer cycles in each row and m denotes the number of rows. Alphabetic characters indicate the values of the data.

Even when the range scale is switched, new and past images are displayed in superimposition on each other on the new range immediately after the range switching as seen above. Therefore, it is possible to eliminate the conventionally encountered problem that the past image is not displayed after the range switching.

Although the current-image video memory 20 which is used as the transfer destination serves also as a buffer in the above-described embodiment in the first step, a buffer may be provided separately from the memory 20. The present invention can also be applied to transferring data defined in a polar coordinate system. Furthermore, the invention is applicable not only to the radar apparatus but also to apparatus similar to the radar apparatus in which two image memories are used to display superimposed images, such as a sonar in which most recently received data is stored in a current-image video memory and previously received data is accumulatively stored in a past-image video memory According to the present invention, when the range scale is switched from an old range to a new range, it is possible to display a past image in a scale conforming to the new range on the display unit immediately after the range switching. Thus, in a radar apparatus, for example, in which past tracks of target ships are stored in a past-image video memory, it is possible to instantly present the past tracks of the target ships even when the range scale has been switched. This invention is therefore extremely useful.

Furthermore, the invention produces an advantage that it can avoid cost increase because it is not necessary to separately provide a buffer.

There is a further advantage that it becomes possible to reduce processing time required in the event of range switching.

Furthermore, since the address shift data K for the past-image video memory can be set to satisfy K1=1 at all times, the invention is advantageous in that it helps simplify the circuitry.

Moreover, the invention serves to prevent important data from being erased by the maximum data sampling operation.

INDUSTRIAL APPLICABILITY

The present invention is applicable to ships of general types on which it is preferable to continuously recognize the movements of target ships on a radar screen, as well as fishing vessels on which it is desirable to continuously watch the movements of fish schools on a sonar screen.

What is claimed is:

1. Radar and like apparatus comprising:
   a current-image video memory for storing most recently received data;
   a past-image video memory for accumulatively storing previously received data;
   an indicator for superimposing and displaying the data stored in both the current-image video memory and the past-image video memory; and
   a controller for transferring the data stored in the past-image video memory to a buffer in a first step and re-transferring the data stored in the buffer back to the past-image video memory in a second step when display range scale has been changed, wherein address shift data K specifying the amount of address shift per transfer cycle in the buffer and the past-image video memory for said data transfer and re-transfer processes is changed in accordance with the range scale.

2. The radar and like apparatus as recited in claim 1, wherein the current-image video memory is used also as the buffer.

3. The radar and like apparatus as recited in claim 1 or 2, wherein the controller clears data content of the past-image video memory, which is a transfer source, at the same time when the data is transferred in the first step.

4. The radar and like apparatus as recited in one of claims 1 or 2, wherein the controller sets the address shift data K to satisfy K=1 for a transfer source and K=1/N for a transfer destination when scaling an on-screen image by a factor of 1/N, and to satisfy K=1/N for the transfer source and K=1 for the transfer destination when scaling the on-screen image by a factor of N.

5. The radar and like apparatus as recited in one of claims 1 or 2, wherein when executing a scale-down operation in which multiple memory pixels of a transfer source correspond to one memory pixel of a transfer destination, the controller causes data having a maximum value among data in the multiple memory pixels of the transfer source to be stored in the one memory pixel of the transfer destination.

6. Radar and like apparatus comprising:
   a current-image video memory for storing most recently received data;
   a past-image video memory for accumulatively storing previously received data;
   an indicator for superimposing and displaying the data stored in both the current-image video memory and the past-image video memory;
   stored data transfer means for transferring the data stored in the past-image video memory to the current-image video memory in a first step and re-transferring the data stored in the current-image video memory back to the past-image video memory in a second step when display range scale has been changed;
   shift data setting means for changing address shift data K specifying the amount of address shift per transfer cycle in the current-image video memory and the past-image video memory for said data transfer and re-transfer processes in accordance with the range scale;
   first access detecting means for judging whether each pixel of the video memory used as a transfer destination is at a first-accessed address when executing a scale-down operation in which the address shift data K for the transfer destination is smaller than the address shift data K for a transfer source; and means for transferring data stored in the transfer source video memory to an address of the transfer destination video memory if the first access detecting means judges that said address is first accessed, and writing the data stored in the transfer source video memory or data previously stored in said address of the transfer destination video memory, whichever having a larger value, based on a comparison of these data if said address is not first accessed.

* * * * *